United States Patent [19]

Barley

[11] Patent Number: 5,206,991
[45] Date of Patent: May 4, 1993

[54] METHOD FOR PRODUCING HOSE COUPLINGS

[75] Inventor: Barry L. Barley, Hellam, Pa.

[73] Assignee: Caterpillar Inc., Peoria, Ill.

[21] Appl. No.: 803,841

[22] Filed: Dec. 9, 1991

[51] Int. Cl.$^5$ .................. B21D 53/00; B21K 29/00; B23P 15/26

[52] U.S. Cl. ................. 29/890.144; 29/455.1; 29/DIG. 4; 29/DIG. 12

[58] Field of Search .......... 29/DIG. 4, DIG. 12, 29/890.144, 455.1; 228/221, 263.16, 140, 135, 254; 285/238, 242, 257

[56] References Cited

U.S. PATENT DOCUMENTS

| | | | |
|---|---|---|---|
| 2,148,747 | 2/1939 | Hampe et al. | 228/140 X |
| 2,448,907 | 9/1948 | Ost | 29/DIG. 4 X |
| 2,684,043 | 7/1954 | Hughes | 29/455.1 X |
| 2,779,999 | 2/1957 | Boam et al. | 29/498 |
| 3,325,194 | 6/1967 | Grawey | 285/257 |
| 3,471,180 | 10/1969 | Grawey et al. | 285/257 |
| 3,589,752 | 6/1971 | Spencer | 285/257 |
| 3,590,455 | 7/1971 | Harris | 29/890.144 |
| 3,699,625 | 10/1972 | Spencer et al. | 29/157 |
| 3,858,911 | 1/1975 | Martin | 228/263.16 |
| 3,986,899 | 10/1976 | Kole et al. | 148/24 |
| 4,006,524 | 2/1977 | Frank | 29/455.1 |
| 4,011,982 | 3/1977 | Marancik | 228/263.16 X |
| 4,150,466 | 4/1979 | Horvath | 29/455.1 X |
| 4,620,660 | 11/1986 | Turner | 228/221 X |
| 4,869,422 | 9/1989 | Turner | 228/221 X |
| 5,071,174 | 12/1991 | Griffin et al. | 228/263.16 X |

FOREIGN PATENT DOCUMENTS

| | | | |
|---|---|---|---|
| 0013460 | 2/1977 | Japan | 228/263.16 |
| 0016771 | 6/1978 | Japan | 228/263.16 |

Primary Examiner—Timothy V. Eley
Assistant Examiner—C. Richard Martin
Attorney, Agent, or Firm—Alan J. Hickman

[57] ABSTRACT

A method for producing a copper brazed hose coupling assembly from a plurality of members in which one of the members is electroplated with copper is provided. A stem member is press fitted to a collet member and subsequently brazed together in a furnace. The copper material being located adjacent the joint between the stem and collet members results in a high quality braze joint to be provided with a predetermined minimum amount of copper. The copper brazed hose coupling is particularly suited for use in a fluid operated system.

34 Claims, 5 Drawing Sheets

Fig. 4.

- COPPER PLATED MEMBERS (82)
- UNPLATED MEMBERS (84)
- DEGREASE MEMBERS (86)
- ASSEMBLE MEMBERS (88)
- PRESS MEMBERS (90)
- PLACE MEMBERS ON RACK (92)
- PLACE RACK IN FURNACE (100)
- EVACUATE FURNACE (112)
- HEAT FURNACE (116)
- COOL FURNACE (120)
- REMOVE RACK FROM FURNACE (124)

METHOD FOR PRODUCING HOSE COUPLINGS

DESCRIPTION

1. Technical Field

This invention relates to a method for producing a copper brazed hose coupling and more particularly to a method for producing a copper brazed hose coupling assembly from a plurality of members of which one member which is copper plated.

2. Background Art

It is known to produce a hose coupling assembly for use in a fluid system from a plurality of members which are joined together mechanically. Typically, the hose coupling assembly has a collet member and a stem member which are joined together by swaging, pressing or other mechanical connecting methods. In fluid operated systems where the pressure is moderate to low, less than 4,000 pounds per square inch, mechanical joining techniques are adequate to provide a leak tight joint at the juncture of the connection between the collet and stem members. However, in high pressure applications, more than 4,000 pounds per square inch, the joint is prone to leakage and in extreme applications the stem may separate from the collet. Should separation of the stem and collet members occur a sudden loss in fluid pressure may result in damage to the fluid operated system. Should the fluid operated system be associated with one or more implement or vehicle functions of a material handling vehicle, earth moving vehicle, and the like or one or more functions of a manufacturing machine, assembly machine and the like, failure of the hose coupling assembly will result in undesirable down time and a loss of productivity.

In order for the hose coupling assembly to be able to withstand the pressure of high pressure applications it has been a practice to copper braze the collet member to the stem member at the juncture of contact therebetween. In some hose coupling assemblies a flange, head member and the like may be brazed to the stem member in addition to the collet member. One method of achieving copper brazing includes placing a copper paste mixture on the member to be brazed to the stem member and heating the hose coupling assembly until copper brazing of the member to the stem member was completed. Another method includes placement of one or more copper rings of a predetermined mass on the stem member adjacent the member to be brazed to the stem and then heating the assembly until the copper ring melts and brazing occurs. Also, the amount of time to manually place the paste on the hose coupling assembly before brazing is substantial. In the copper paste brazing application, the variability of the amount of the paste used results in poor quality braze joints. In the copper ring method of brazing the quality of the brazed joint is improved, but the cost of manual assembly of the rings on the stem member is substantial.

It has been found that during pressing of the collet member on the stem member that the softer steel material of the collet member is often pushed by the harder steel stem member and forms a flash like body of material on the side of the collet member adjacent the stem in the direction of pressing movement of the stem member. This flash, when large enough in dimensions, prevents a flexible hose, for example, a steel reinforced rubber hose from being properly held and seated in the collet member during assembly. As a result improper sealing occurs and the potential for leakage between the stem member and hose is increased.

The present invention is directed to overcoming one or more of the problems as set forth above.

DISCLOSURE OF THE INVENTION

In one aspect of the present invention, a method for producing a copper brazed steel hose coupling assembly from a plurality of component members is provided. The method comprises the steps of: assembling the component members together, one of the component members being electroplated with a coating of copper having a preselected thickness; placing the hose coupling assembly in a furnace; heating the hose coupling assembly in the furnace and copper brazing at least two of the component members together; and removing the copper brazed hose coupling assembly from the furnace.

In another aspect of the present invention, a method for producing a copper brazed steel hose coupling assembly having flange, collet and stem members is provided. The method comprises the steps of: electroplating one of the flange and stem members with a copper coating; placing the flange member on the stem member; pressing the collet member on the stem member; placing the hose coupling assembly in a furnace; heating the hose coupling assembly in the furnace and copper brazing the collet and flange members to the stem member.

In yet another aspect of the present invention a method for producing a copper brazed steel hose coupling assembly having stem and collet members and a bore disposed in the collet member is provided. The method comprises the steps of: electroplating the stem member with copper to a preselected copper plated thickness; positioning the collet member on a mandrel; placing the stem member in the bore of the collet member; pressing the stem member into an interference fit with the collet member; heating the assembled stem and collet members in a furnace to a preselected copper brazing temperature; maintaining the furnace at the preselected temperature for a preselected period of time sufficient to cause copper brazing of the stem member to the collet member; cooling the brazed stem and collet members; and removing the brazed stem and collet members from the furnace.

BEST MODE FOR CARRYING OUT THE INVENTION

Figure 1:
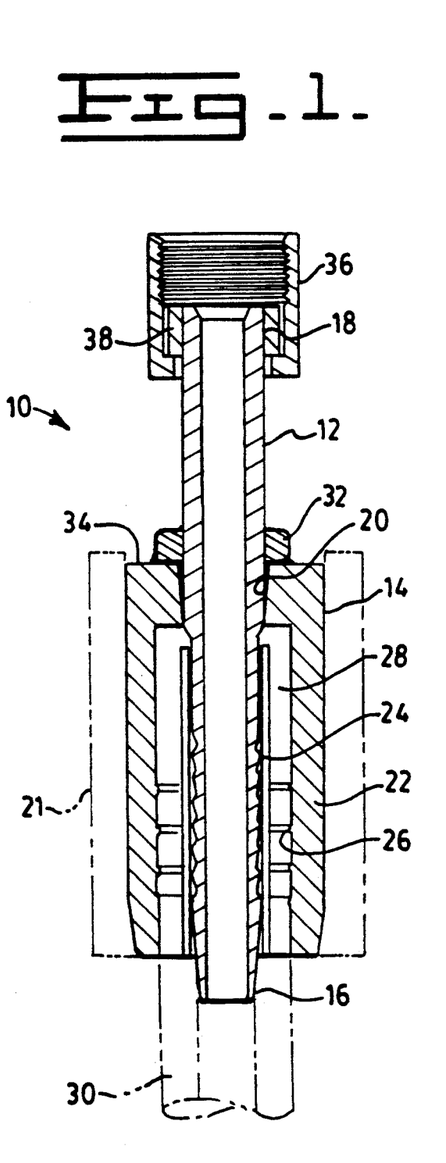
FIG. 1 is a diagrammatic cross sectional view of an embodiment of the hose coupling assembly of the present invention.

With reference to the drawings, and particularly FIG. 1 a copper brazed steel hose coupling assembly 10 has a stem member 12 and a collet member 14 which is coaxially disposed about the stem member 12 and connected to the stem member 12 at a location on the stem member 12 between first and second spaced end portions 16,18. The collet member 14, which is substantially cylindrical in shape, has a bore 20 disposed therethrough and a barrel portion 22 consisting of a plurality of substantially parallel tines. The stem member 12 has a plurality of ridges 24 on a surface of the first end portion 16. Similarly, the barrel portion 22 of the collet 14 has a plurality of ridges 26 extending radially therefrom and toward the ridges 24 of the stem member 12. The ridges 26,24 are provided to engage a flexible hose of elastomeric material disposed about the first end portion 16 of the stem member 12 and in a substantially cylindrical recessed area 28 defined by the barrel portion 22 of the collet. The stem member 12 is in an interference fit with the collet member 14 at the bore 20.

Figure 2:
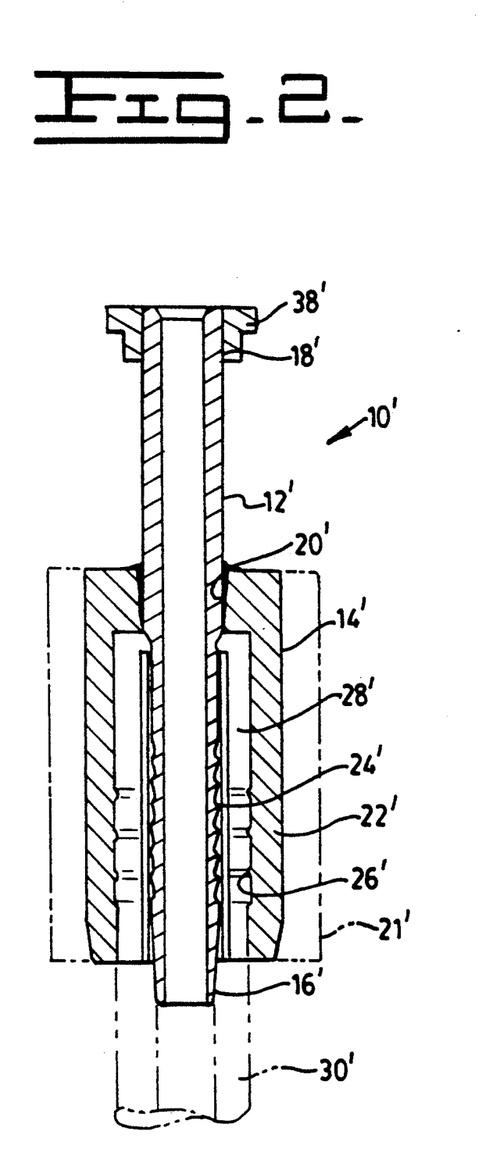
FIG. 2 is a diagrammatic cross sectional view of another embodiment of the hose coupling assembly of the present invention.

The embodiment disclosed in FIG. 2 is identical to the embodiment of FIG. 1 as previously discussed. Reference numerals of the embodiment of FIG. 2 identifying parts identical to those already described with respect to FIG. 1, are identified by identical numerals followed by a prime (').

Referring back to FIG. 1, a flange member 32 having a hex shaped outer periphery for engagement with a wrench during attachment to a fluid operated system is plated with copper, slidably disposed about the stem member 12, and engaged with and end 34 of the collet member 14. A nut 36 is slidably disposed about the stem member 12 and movably retained on the stem member 12 at a location between the flange member 32 and a head member 38 located at the second end portion 18 of the stem 12. As seen in FIGS. 1 and 2, the head member 38,38' may be an integrally formed or machined part of the stem member 12,12' or pressed on the second end portion 18. The stem members 12,12' or one of the flange 32 or head members 38,38' is electroplated with copper so that production of the copper brazed steel hose coupling assembly 10,10' may be achieved with a minimum of time and materials waste.

A sleeve 21,21' axially slidably disposable about the collet member 14,14' is engageable with the collet member 14,14'. The sleeve 21,21' urges the tines of the collet member 14,14' radially inwardly toward the stem member 12,12' and causes the tines to engage the hose 30,30' located in the recessed area 28,28' between the stem member 12,12' and the tines. The force of the collet member 14,14' on the hose 30,30' and the gripping action of the projections 24,24',26,26' retains the hose 30,30' in the recessed area 28,28'. Such sleeve 21,21' and collet member 14,14' construction are well known in the art and therefore will not be discussed in any greater detail.

A method for producing the copper brazed steel hose coupling assembly from a plurality of component members including at least the stem and collet members 12,14' and optionally the flange and head members 32,38 is provided. The method includes assembling the members together. One of the members, for example, the stem member 12, flange member 32, or head member 38 are electroplated with a coating of copper having a preselected thickness. The thickness of copper is determined as a function of the size of the contacting surface area between the stem and collet members 12,14 and optionally the flange and head members 32,38, when utilized. It has been estimated that the thickness of the copper plating is in a range of between 0.0005 inches to 0.002 inches. In assemblies where the flange member 32, and no other members, is copper plated the thickness of plating is approximately 0.002 inches. In assemblies where the stem member 12 is plated, the thickness of the copper plating will be between 0.0005 and 0.002 inches. This thickness is a function of the diameter of the stem member 12 to be brazed to the collet member 14. The larger the the stem member 12 diameter the smaller the amount of plating thickness required. In applications wherein the head member 38 is plated the thickness of the copper plating is approximately 0.002 inches.

Figure 3:
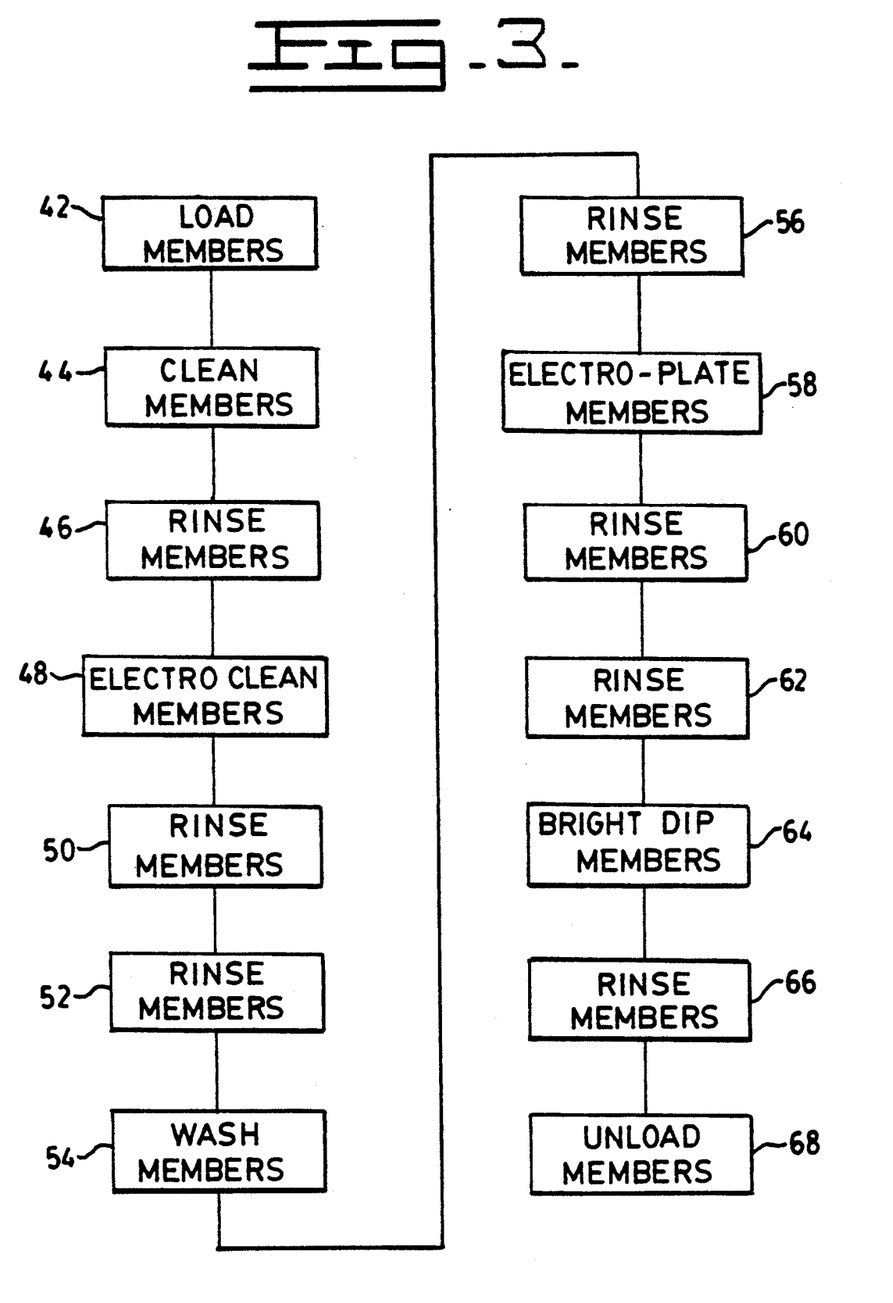
FIG. 3 is a flow chart of the electroplating process used to copper plate selected component parts of the hose coupling assembly.

As best seen in FIG. 3, the process for electroplating selected component members, for example, the stem member 12, 12', the flange member 32, and head member 38,38' is shown in the form of a flowchart. The process of electroplating is well known in the art and therefore will be discussed briefly. The first step in the electroplating process, box 42, includes loading the selected ones of the members 12,12',32,38,38' in a suitable container. Typically the electroplating production line, often referred to as a barrel line, includes a plurality of sequentially adjacent tanks, in which the containers, referred to as barrels, are submersed. The containers have a plurality of openings to permit the liquid in the tanks to enter.

Referring to box 44 of the flow chart of FIG. 3, the members are cleaned by submersing the container in a soak tank containing an alkaline liquid. The container is maintained submersed for a predetermined period of time adequate to remove dirt, grease and the like from the selected members. The next step, box 46, requires the rinsing of the members by weigh the subsmersion in or the spraying with water. The next step in the process of electroplating the members, box 48, is to electroclean the components. This followed by two separate water rinsing cycles, boxes 50,52. The member are then acid washed by submersion, box 54, and rinsed by submersion in water, box 58.

Electroplating of the members, as indicated in box 58, is achieved by a standard electroplating process, Specifically, the container is placed in a plating tank of any suitable design. The lating tank includes at least one anode, a cathode, and a solution consisting of cyanide, copper and other additives. The electroplating process takes approximately 40 minutes per 0.001 inch of copper lating thickness. The member are then rinsed twice in a cold water wash, boxes 60,62, and then bright dipped, box 64. The bright dip consists of a solution of nitric acid (HNO$_3$). As indicated in box 66, type components are then rinsed by submersion in water. The final step includes unloading the member from the container, box 68.

Assembly of the selected members of the hose coupling member 10, of FIG. 1. prior to copper brazing is achieved in the following prior to copper brazing is achieved in the following manner. The collet member 14 is placed about a tubular projection 70 extending axially normally from a base portion 72 of mandrel 40. The collect member 14 is disposed about the tubular projection 70. The stem member 12 is then inserted in the bore 20 and the flange member 32 is slidably disposed about the stem 12 and in contact with the end 34 of the collet member 14. The nut 36 is then placed about the stem member 12 and the head member 38 is positioned on the second end portion 18 of the stem member 12. The head member 38 is subsequently forcibly urged onto the stem member 12 and the stem is forcibly urged into position on the collect member 14 by a press 76 of any suitable design. The press may be manually, electrically, or hydraulically given in a conventional manner.

alternatively, the steps indicated above may be modified slightly without departing from the invention. For example the, stem, collet, flange and head members 12,14,32,38 and nut member may be assembled in the same sequence prior to being placed on the tubular projection 70.

Figure 5:
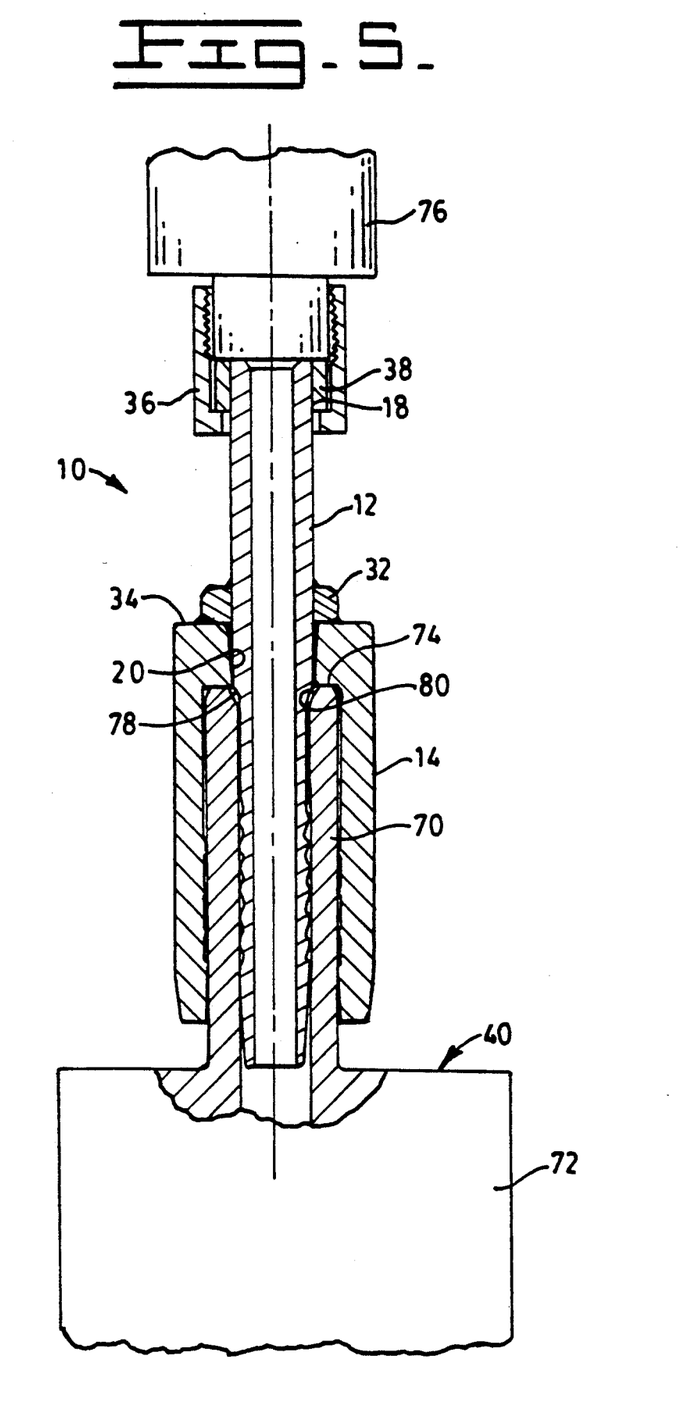
FIG. 5 is a diagrammatic cross sectional view of the hose coupling assemblies of FIGS. 1 showing the pressing operation.

It is to be noted that the bore 20 is chambered or tapered so that the opening at surface 34 is largest in diameter. Preferably the chamber is in the range of 3-10° to reduce the potential for the softer steel material of the collet 14 from being pushed by the stem 12 during the pressing operation. Pushing of metal causes flash to form in the recessed area 289 of the collet at a location adjacent the stem member 12. The ultimate axial position of the stem member 12 relative to the collet 14 after press fitting is controlled by the tubular projection 70. In the particular embodiment shown in FIG. 5 the axial position of the stem member 12 is controlled by the conical surface 78 on the stem member and the conical surface 80 on the tubular projection 70. Therefore, the axial extension of the first and second end portions 16,18 relative to the surface 34 of the collet 14 can be closely controlled.

In hose couplings such as shown in FIG. 2 where no flange member 32 is provided and the stem member 12' is electroplated with copper it has been found that the lubricity of the copper plating on the stem member 12' improves the press fitting of the stem 12 to the collet member 14 and reduces the potential for the pushing of metal such as previously described. It is to be noted that assembly of the embodiment as shown in FIG. 2 is achieved in the same manner as discussed with respect to the assembly of the embodiment of FIG. 1 as disclosed in FIG. 5 absent the deleted member 32. The interference or press fit between the mating pieces, the stem 12,12' and the collet 14,14' is in a range of between 0.002 and 0.005 inches.

Figure 4:
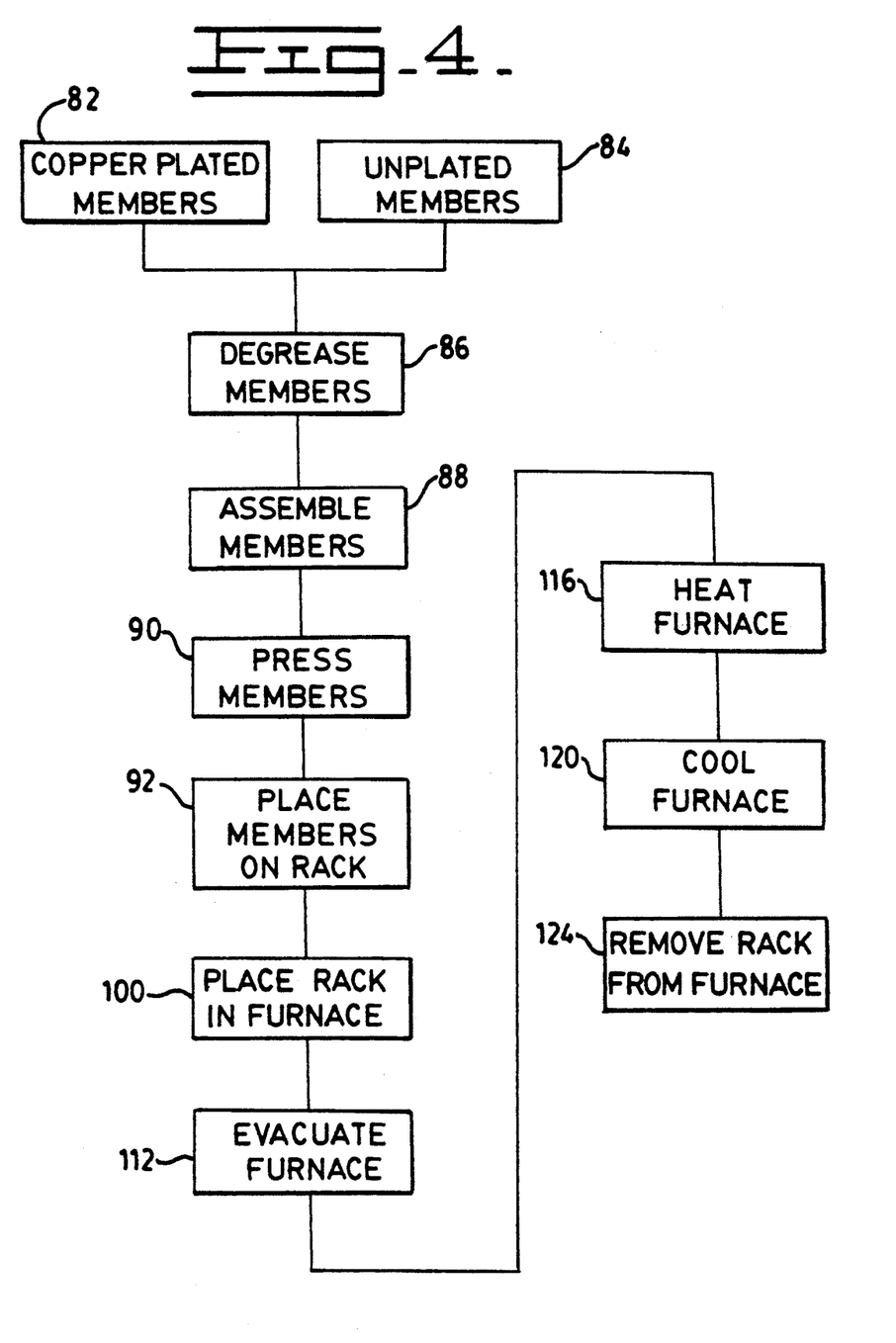
FIG. 4 is a flow chart of the method for assembling and cooper brazing the hose coupling assembly.

As best seen in FIG. 4, a flowchart disclosing the method for copper plating the hose coupling assemblies 10,10' is provided. The copper plated and unplated members 12,12',14,14' and optionally 32,36,38,38', of boxes 82 and 84 of the flowchart, are degreased or washed as indicated in box 86 prior to assembly of the members as discussed above. Degreasing or washing includes placing the members in a container (barrel, basket, rack, or the like) and emersing the container in a tank containing a suitable degreasing or washing solution. The wash solution is preferably alkaline and capable of adequately cleaning the members in a brief period of time.

Figure 6:
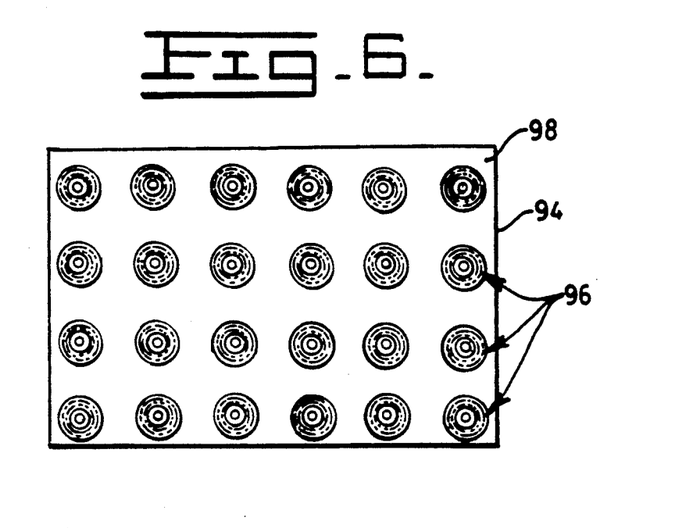
FIG. 6 is a diagrammatic top plan view of a rack supporting a plurality of hose couplings in an upright orientation prior to placement in a furnace for brazing.
Figure 7:
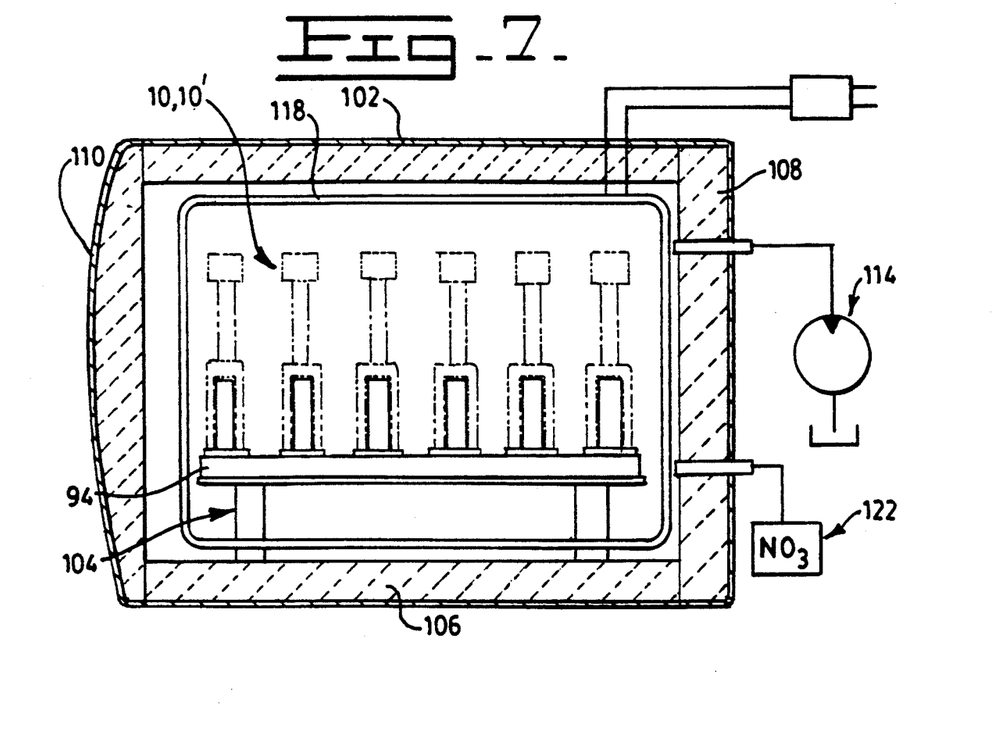
FIG. 7 is a diagrammatic cross sectional view of the furnace showing the rack in position for brazing.

Selected ones of the members 12,12',14,14'32,36,38,38' are then assembled and pressed together as discussed in detail above and referred to in boxes 88,90. Referring to box 92, the next step is to place the unbrazed hose coupling assemblies on a suitable rack. As best seen in FIG. 6 the rack 94, which is rectangular in shape, has a plurality of preferably equally spaced apart posts 96. The posts 96 extend from a surface 98 of the rack. The posts 96 are axially parallel to each other and arranged in equally spaced apart rows and columns. The rack is made of any suitable material capable of resisting extremely high temperatures. For example, the rack 94 may be made of a ceramic material, graphite material, or the like. The unbrazed steel hose coupling assemblies 10,10' are each positionable on one of the posts 96 and supported thereon for transport and brazing in a furnace. As best seen in FIGS. 6 and 7, the steel hose coupling assemblies 10,10' and particularly the collet members thereof are positioned about on the posts 96. The unbrazed steel hose coupling assemblies 10,10' are supported from inadvertent tipping, moving, or the like by the posts 96. The posts 96 also maintain the adjacent ones of the steel hose coupling assemblies a preselected distance apart so that equal temperature distribution in the furnace 102 relative to each of the steel hose coupling assemblies 10,10' is achievable.

Referring to FIG. 4, box 100, the rack 94 is placed in the furnace 102 of any suitable design. As best seen in FIG. 7, the rack 94 is placed on a stand 104, table, or the like located within the furnace 102. The furnace 102 has and insulated cylindrical side wall 106, an insulated rear wall 108, and an insulated door 110 which is connected to the side wall 106 and movable relative thereto between open and closed positions so that the rack 94 may be placed within or removed from the chamber of the furnace 102. Subsequent to the rack 96 being placed on the stand 104 and the door 110 being closed and secured the furnace 102 is evacuated, FIG. 4, box 112. As best seen in FIG. 7 evacuation of the furnace is achieved by a vacuum pump 114 of any suitable design. The furnace is evacuated until 30 pounds per square inch of vacuum has been drawn. The next step involves the heating of the furnace as disclosed in box 116 of FIG. 4. As best seen in FIG. 7 heating of the furnace is achieved by electrical heating elements disposed in the furnace adjacent the walls 106,108 thereof and about the rack 94. The electrical heating elements 118 utilize house current and are capable of heating the furnace to a copper brazing temperature of 1980-2100° F.

Referring to FIG. 4 the process of furnace evacuation 112 takes approximately 15 minutes, the time to heat the furnace to the aforementioned temperature takes approximately 5 minutes, and the time required to braze the collet member 14, flange member 32, when required and head member 38 to the stem member 12 requires 10 to 20 minutes. The next step, box 120 relates to the cooling of the furnace 102. This is achieved by introducing nitrogen gas into the chamber of the furnace where brazing is taking place. Fans within the furnace (not shown) circulates the air in the furnace so that the cooling of each of the copper brazed steel hose coupling assemblies 10,10' are cooled uniformly. The nitrogen gas is introduced to the chamber from an 85 PSI source 122 for example a pressurized tank. Once the furnace temperature reaches 300° F. the furnace is returned to atmospheric pressure by any suitable vent valve. The entire process of copper brazing takes in the range of between 2 and 4 hours of furnace time. The door 110 is then opened and the rack 94, as indicated in box 124 of FIG. 4, is removed from the furnace 102. Removal of the rack 94 of the furnace 102 is achieved in an assortment of ways, for example, by a fork lift truck, overhead crane or the like.

Industrial Applicability

With reference to the drawings, the method for producing the copper plated steel hose coupling assemblies 10,10' from selected ones of a plurality of members 12,12',14,14'32,36,38,38', in which at least one of the stem 12, and flange 32 members is copper plated prior to assembly is particularly advantageous. The advantages flow from a reduction in assembly time, a reduction in the inventory of parts (copper rings and paste), and an improvement in the accuracy of the amount of copper provided for a given application.

The method includes the assembly of the aforementioned members, based on FIGS. 1 and 2 and the mechanical joining of the collet member 14 to the stem member 12. Because the members are mechanically joined before brazing accuracy of axial location of the stem member 12 relative to the collet member 14 is maintained. In applications wherein the stem member 12 is copper plated, the lubricity of the copper coating at the mechanical joint between the stem member 12 and collet member 14 facilitates assembly and reduces the potential for the pushing of collet material and thus the number of scrap steel hose coupling assemblies 10,10' produced Since the copper plated one of the stem and flange members 12,32 is positioned adjacent the joint between the collet member 14 and the stem member 12 the copper will flow during furnace heating directly to the joint between the collet and stem members 14,12 and thus provides a better braze joint. Because of the accuracy of positioning of the copper a reduction in the amount required is achieved.

The improved copper braze joint between the stem and collet members 12,14 resulting from the above discussed method reduces the potential for a fluid leak to occur at the joint when applied to a fluid application such as a hydraulic operated implement, machine tool and the like. This is particularly true in high pressure applications wherein the fluid pressure exceeds 1000 pounds per square inch.

Other aspects, objects and advantages of the present invention can be obtained from a study of the drawings, the disclosure and the appended claims.

I claim:

1. A method for producing a copper brazed steel hose coupling assembly from a plurality of component members, comprising the steps of:
    assembling the members together, one of the members being electroplated with a coating of copper having a preselected thickness;
    placing the hose coupling assembly in a furnace;
    heating the hose coupling assembly in the furnace and copper brazing at least two of the members together; and
    removing the copper brazed hose coupling assembly from the furnace.

2. A method for producing a copper brazed steel hose coupling assembly, as set forth in claim 1, wherein the members include a collet member and a stem member and including, the step of pressing the collet member on the stem member.

3. A method for producing a copper brazed steel hose coupling assembly, as set forth in claim 2, wherein said copper plated one of the members is the stem member.

4. A method for producing a copper brazed steel hose coupling assembly, as set forth in claim 2, wherein said plurality of members includes a flange member and said copper plated one of the members is one of the stem and flange members.

5. A method for producing a copper brazed steel hose coupling assembly, as set forth in claim 4, wherein said collet and flange members each have a bore, said stem member being disposed in the bore of the collet and flange members, said flange member being slidably disposed about the stem member and said collet member being in an interference fit with the stem member.

6. A method for producing a copper brazed steel hose coupling assembly, as set forth in claim 4, including the step of placing a nut on the seam member prior to placing the flange member on the stem member.

7. A method for producing a copper brazed steel hose coupling assembly, as set forth in claim 2, wherein the electroplated copper coating has a thickness in, a range of 0.0005 to 002 inches.

8. A method for producing a copper brazed steel hose coupling assembly, as set forth in claim 2, wherein the step of heating the hose coupling includes the step of maintaining the hose coupling assembly in the furnace for a period of 2 to 4 hours.

9. A method for producing a copper brazed steel hose coupling assembly, as set forth in claim 2, including the step of maintaining the furnace at a temperature between 1980 and 2100 degrees Fahrenheit for a period of 10 to 20 minutes.

10. A method for producing a copper brazed steel hose coupling assembly, as set forth in claim 2, including the steps of:
    drawing a vacuum in the furnace prior to heating; and
    cooling the furnace with nitrogen prior to removal of the hose coupling assembly from the furnace.

11. A method for producing a copper brazed steel hose coupling assembly, as set forth in claim 10, wherein the step of drawing vacuum in the furnace includes the step of maintaining the vacuum in the furnace at 30 pounds per, square inch during brazing.

12. A method for producing a copper brazed steel hose coupling assembly, as set forth in claim 2, wherein the collet member has a barrel portion and the step of placing the hose coupling assembly in the furnace includes the steps of:
    placing the hose coupling assembly on a brazing rack with the barrel portion of the collet member opening downward and the flange member engaging the collet member;
    placing the brazing rack in the furnace.

13. A method for producing a copper brazed steel hose coupling assembly, as set forth in claim 2, including the steps of:
    placing the collet member on a mandrel; and
    pressing the stem member into interference fit engagement with the collet member.

14. A method for producing a copper brazed steel hose coupling assembly, as set forth in claim 13, wherein the interference fit between the collet and stem members is in a range of between 0.002 to 0.005 inches.

15. A method for producing a copper brazed steel hose coupling assembly, as set forth in claim 13 wherein the steel material of the stem member is harder than the steel material of the collet member.

16. A method for producing a copper brazed steel hose coupling assembly, as set forth in claim 2, including the step of pressing a head member on the stem member.

17. A method for producing a copper brazed steel hose coupling assembly, as set forth in claim 1, including the step of degreasing the plurality of members.

18. A method for producing a copper brazed steel hose coupling assembly, as set forth in claim 2, wherein said collet member having a tapered bore disposed therethrough, and including the step of forcibly moving the seam member into press fit engagement with the tapered bore.

19. A method for producing a copper brazed steel hose coupling assembly having flange, collet and stem members, comprising the steps of:
   electroplating one of the flange and stem members with a coating of copper;
   placing the flange member on the stem member;
   pressing the collet member on the stem member;
   placing the hose coupling assembly in a furnace;
   heating the hose coupling assembly in the furnace and copper brazing the collet and flange members to the stem member.

20. A method for producing a copper brazed steel hose coupling assembly, as set forth in claim 19, wherein the electroplated copper coating has a thickness in a range of 0.0005 to 002 inches.

21. A method for producing a copper brazed steel. hose coupling assembly, as set forth in claim 20, including the steps of:
   placing the collet member on a mandrel; and
   pressing the stem member into interference fit engagement with the collet member.

22. A method for producing a copper brazed steel hose coupling assembly, as set forth in claim 21, wherein the interference fit between the collet and stem members is in a range of between 0.002 to 0.005 inches.

23. A method for producing a copper brazed steel hose coupling assembly, as set forth in claim 21 wherein the steel material of the stem member is harder than the steel material of the collet member.

24. A method for producing a copper brazed steel hose coupling assembly, as set forth in claim 23, wherein said collet and flange members each have a bore, said stem member being disposed in the bore of the collet and flange members, said flange member being slidably disposed about the stem member and said collet member being in an interference fit with the stem member.

25. A method for producing a copper brazed steel hose coupling assembly, as set forth in claim 19, including the steps of:
   drawing a vacuum in the furnace prior to heating; and
   cooling the furnace with nitrogen;
   removing the hose coupling assembly from the furnace.

26. A method for producing a copper brazed steel hose coupling assembly, as set forth in claim 19, including the step of placing a nut on the stem member prior to placing the flange member on the stem member.

27. A method for producing a copper brazed steel hose coupling assembly having stem and collet members, said collet member having a bore disposed therein, comprising the steps of:
   electroplating the stem member with copper to a preselected plated thickness;
   positioning the collet member on a mandrel;
   placing the stem member in the bore of the collet member;
   pressing the stem member into an interference fit with the collet member;
   heating the assembled stem and collet members in a furnace to a preselected copper brazing temperature;
   maintaining the furnace at the preselected temperature for a preselected period of time sufficient to cause copper brazing of the stem member to the collet member;
   cooling the brazed stem and collet members; and
   removing the brazed stem and collet members from the furnace.

28. A method for producing a copper brazed steel, hose coupling assembly, as set forth in claim 27, wherein the electroplated copper coating has a thickness in a range of 0.0005 to 002 inches.

29. A method for producing a copper brazed steel hose assembly, as set forth in claim 28, wherein said interference fit between the collet and stem members lies within a range of between 0.002 to 0.005 inches.

30. A method for producing a copper brazed steel hose coupling assembly, as set forth in claim 28, including the step of maintaining the furnace at a temperature between 1980 and 2100 degrees Fahrenheit for a period of 10 to 15 minutes.

31. A method for producing a copper brazed steel hose coupling assembly, as set forth in claim 28, including the steps of:
   drawing a vacuum in the furnace prior to heating; and
   cooling the furnace with nitrogen prior to removal of the hose coupling assembly from the furnace.

32. A method for producing a copper brazed steel hose coupling assembly, as set forth in claim 31, wherein the step of drawing vacuum in the furnace includes the step of maintaining the vacuum in the furnace at 30 pounds per square inch during brazing.

33. A method for producing a copper brazed steel hose coupling assembly, as set forth in claim 28, wherein the steel material of the stem member is harder than the steel material of the collet member.

34. A method for producing a copper brazed steel hose coupling assembly, as set forth in claim 27, including the step of pressing a head member on the stem member.

* * * * *